US008498887B2

(12) United States Patent
Lo Yuk Ting et al.

(10) Patent No.: US 8,498,887 B2
(45) Date of Patent: Jul. 30, 2013

(54) ESTIMATING PROJECT SIZE

(75) Inventors: Gary Sit Chong Lo Yuk Ting, Singapore (SG); Jaime Low, Singapore (SG); Hu Chong Ng, Raleigh, NC (US); An Xian, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 788 days.

(21) Appl. No.: 12/276,933

(22) Filed: Nov. 24, 2008

(65) Prior Publication Data

US 2010/0131314 A1 May 27, 2010

(51) Int. Cl.
  *G06Q 40/00* (2012.01)
(52) U.S. Cl.
  USPC .......................... 705/7.11; 705/7.42
(58) Field of Classification Search
  USPC .......... 705/7, 8, 9, 10, 11, 7.11, 7.42
  See application file for complete search history.

(56) References Cited

U.S. PATENT DOCUMENTS

| | | | | |
|---|---|---|---|---|
| 6,073,107 | A * | 6/2000 | Minkiewicz et al. | 705/7.17 |
| 7,149,716 | B2 * | 12/2006 | Gatto | 705/36 R |
| 7,509,277 | B1 * | 3/2009 | Gatto | 705/36 R |
| 7,539,637 | B2 * | 5/2009 | Gatto | 705/36 R |
| 7,603,308 | B2 * | 10/2009 | Gatto | 705/36 R |
| 7,676,490 | B1 * | 3/2010 | Cassone et al. | 707/805 |
| 7,734,489 | B2 * | 6/2010 | Cimral et al. | 705/7.39 |
| 7,734,490 | B2 * | 6/2010 | Cimral et al. | 705/7.39 |
| 7,756,734 | B2 * | 7/2010 | Cimral et al. | 705/7.39 |
| 7,774,743 | B1 * | 8/2010 | Sanchez et al. | 717/103 |
| 2002/0002520 | A1 * | 1/2002 | Gatto | 705/36 |
| 2002/0052820 | A1 * | 5/2002 | Gatto | 705/36 |
| 2003/0018592 | A1 | 1/2003 | Srinivasa et al. | |
| 2005/0114828 | A1 | 5/2005 | Dietrich, Jr. et al. | |
| 2005/0289503 | A1 | 12/2005 | Clifford | |
| 2007/0276712 | A1 | 11/2007 | Kolanchery et al. | |
| 2009/0216602 | A1 * | 8/2009 | Henderson | 705/9 |

OTHER PUBLICATIONS

Pan et al., "A New Method for Improving the Prediction of Software Cost", SCI 2003, 7th World Multiconference on Systemics, Cybernetics and Informatics Proceedings, 273-275 vol. 5, IIIS Jul. 2003, pp. 1-2.

* cited by examiner

*Primary Examiner* — Thomas Dixon
*Assistant Examiner* — Benjamin S Fields
(74) *Attorney, Agent, or Firm* — Yee & Associates, P.C.; Steven L. Bennett

(57) ABSTRACT

A system for effective project size estimation. In response to receiving an input to predict a size of effort required to complete a project, a set of metrics associated with the project is identified. All possible subsets of metrics are constructed from the identified set of metrics associated with the project. One project size prediction model is generated for each constructed subset of metrics from the identified set of metrics associated with the project. An accuracy score is calculated for each generated project size prediction model. A project size prediction model is selected with a highest calculated accuracy score to identify a subset of effective metrics for the project. The subset of effective metrics is associated with the project size prediction model with the highest calculated accuracy score. Then, the project size prediction model with the highest calculated accuracy score is outputted for use by a project developer.

17 Claims, 5 Drawing Sheets

502 — variables:

n : total number of projects in historical dataset
x : number of projects in training dataset
r : number of tests to be completed
errHT : a hash table storing the mapping between metric subsets and their *avgError*

EFFECTIVE PROJECT SIZE
ESTIMATION PROCESS
500

```
/**
504 — *Try all subsets of metrics to select
      * the most effective subset as prediction
      * input.
      */
    For each subset of metrics  s
    {
       error = 0.0;
    /**
506 — *run r tests for each metric subset
      *to get its average performance.
      */
    For i = 1 to r
    {
508 — Choose x projects as training data and the corresponding (n-x) projects as validation data;
510 — Build prediction model m from training data;
512 — Run model m against validation data;
    For each project as validation data
    {
        Append the predicted man-day values to list pl;
514 —   Append the actual man-day values to list al;
    }
    MRE = 0.0;
       For j = 1 to (n-x)
       {
          MRE' = | al [ j ] - pl [ j ] | / al [ j ] ;
516 —     MRE = MRE + MRE' ;
       }
518 — MMRE = MRE / (n-x) ;
       error = error + MMRE ;
    }
       avgError =error / r ;
       errHT .add (s , avgError );
    }
520 — Selected the entry E in errHT with minimum avgError ;
       Store the metric subset in entry E as S;  — 522
524 — Use S to build prediction model M based on all n projects;
526 — Enter metric values of a new project;
       Run model M against metric values;  — 528
530 — Get the effort required for the project;
```

FIG. 5

ESTIMATING PROJECT SIZE

BACKGROUND OF THE INVENTION

1. Field of the Invention

The present invention relates generally to an improved data processing system and more specifically to a computer implemented method, system, and computer usable program code for automatically estimating project size and effort required for project development.

2. Description of the Related Art

Today, one of the biggest problems facing any business is accurate effort prediction for any type of project. For example, it is unusual for a software development project to actually be delivered on the planned date, within the budgeted cost, and having all the planned features. Consequently, businesses go over budget and beyond promised due dates because of poor project predictions, thus causing decreased revenues. Therefore, accurate project size estimation and effort prediction are key factors for effective project planning and resource allocation. With accurate project size estimation, effort required for project development may easily be predicted and resources may be efficiently allocated.

BRIEF SUMMARY OF THE INVENTION

According to one embodiment of the present invention, effective project size estimation is provided. In response to receiving an input to predict a size of effort required to complete a project, a set of metrics associated with the project is identified. All possible subsets of metrics are constructed from the identified set of metrics associated with the project. One project size prediction model is generated for each constructed subset of metrics from the identified set of metrics associated with the project. An accuracy score is calculated for each generated project size prediction model. A project size prediction model is selected with a highest calculated accuracy score to identify a subset of effective metrics for the project. The subset of effective metrics is associated with the project size prediction model with the highest calculated accuracy score. Then, the project size prediction model with the highest calculated accuracy score is outputted for use by a project developer.

BRIEF DESCRIPTION OF THE SEVERAL VIEWS OF THE DRAWINGS

FIG. 5 is an exemplary illustration of a process for effective project size estimation in accordance with an illustrative embodiment.

DETAILED DESCRIPTION OF THE INVENTION

Figure 1:
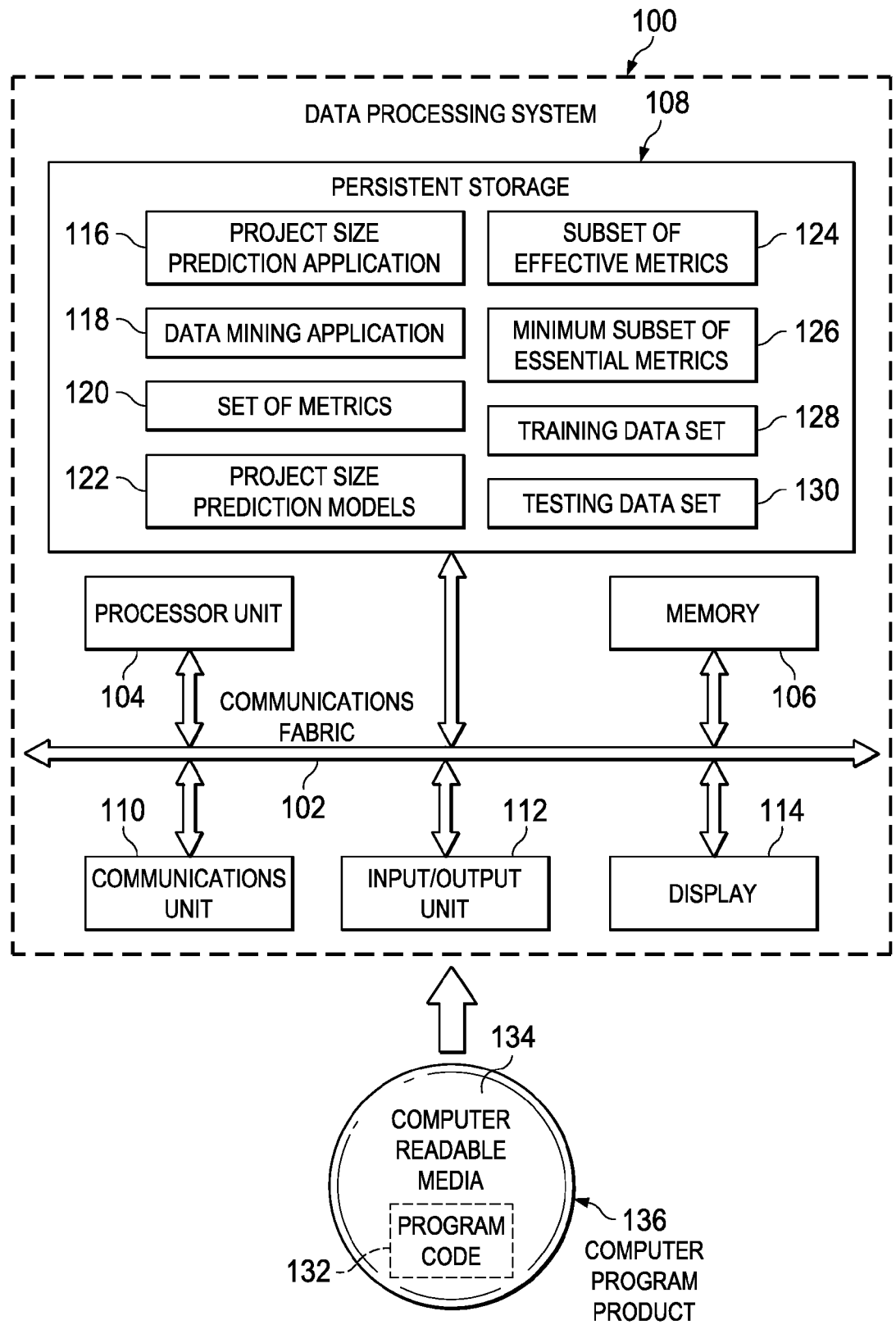
FIG. 1 is a diagram of a data processing system in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowcharts and/or block diagram block or blocks.

With reference now to the figures and in particular with reference to FIG. 1, an exemplary diagram of a data processing environment is provided in which illustrative embodiments may be implemented. It should be appreciated that FIG. 1 is only exemplary and is not intended to assert or imply any limitation with regard to data processing environments in which different illustrative embodiments may be implemented. Many modifications to the depicted environment may be made.

FIG. 1 depicts a diagram of a data processing system in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a transient basis and/or a persistent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Project size prediction application 116, data mining application 118, set of metrics 120, project size prediction models 122, subset of effective metrics 124, minimum subset of essential metrics 126, training data set 128, and testing data set 130 reside on persistent storage 108. Project size prediction application 116 is a software application that monitors and controls the process for automatic project size estimation and effort prediction for project development. Data mining application 118 is a software application that project size prediction application 116 utilizes to generate or build project size prediction models for each new project.

Data mining application 118 may, for example, be Intelligent Miner™, which is a product of IBM®. Data mining application 118 uses a neural network to approximate any non-linear function. A neural network is a machine learning technique that can approximate non-linear functions. Effort required to complete a project is not always a linear function of the identified metrics for the project and, therefore, illustrative embodiments utilize an application capable of approximating non-linear functions.

Set of metrics 120 is a plurality of metrics associated with a particular project. A project is a task or planned program of work, which requires an amount of time, effort, and planning to complete. A project may, for example, be a house building project or a software development project. A project includes a plurality of metrics. A metric quantifies a portion or a unit of a project and may be anything that influences the development of the project. For example, a metric for a house building project may be the number of windows to be included in the house. Or, a metric for a software development project may, for example, be the number of data declarations and executable statements within a program. Further, set of metrics 120 may represent one or more sets of metrics used for one or more projects.

Project size prediction models 122 are a plurality of prediction models that data mining application 118 builds based on a set of identified metrics associated with a particular project. A project size prediction model is a generated model that is used to predict the size of effort required to complete a project based on the identified metrics associated with the project. In addition, project size prediction models 122 may represent a plurality of prediction models for a plurality of projects.

Subset of effective metrics 124 is a subset of one or more metrics from the set of identified metrics associated with a particular project that most influence the development of that particular project by speeding up or slowing down the development process. Also, subset of effective metrics 124 may represent a plurality of effective metrics that most influence the development of a plurality of projects. Minimum subset of essential metrics 126 is a minimum subset of metrics that are determined to be essential for the development of a particular project based on experience knowledge. The experience knowledge may, for example, be provided by a project developer or by project size prediction application 116 based on same or similar projects previously completed. Furthermore, minimum subset of essential metrics 126 may represent a plurality of minimum subsets of essential metrics for a plurality of projects.

Training data set 128 represents a specific number of projects selected from a total number of projects as training data. The specific number of projects selected as training data is at least one-half of the total number of projects. Training data is historical data collected on same or similar previously completed projects. The historical data is information regarding, for example, the effort required to complete a particular project, the resources required for the project, when each resource was needed, and the amount of time necessary to finish the project.

Testing data set 130 represents the remaining number of projects that were not used in training data set 128. Testing data is the data to be tested or validated by project size prediction application 116. Project size prediction application 116 runs each prediction model associated with a particular project using the prediction model's corresponding testing data.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 132 is located in a functional form on computer readable media 134 that is selectively removable and may be loaded onto or transferred to data processing system 100 for execution by processor unit 104. Program code 132 and computer readable media 134 form computer program product 136 in these examples. In one example, computer readable media 134 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 134 also may take the form of a persistent storage, such as a hard drive, a thumb drive, or a flash memory that is connected to data processing system 100. The tangible form of computer readable media 134 is also referred to as computer recordable storage media. In some instances, computer readable media 134 may not be removable.

Alternatively, program code 132 may be transferred to data processing system 100 from computer readable media 134 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 132 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 132 may be a server computer, a client computer, or some other device capable of storing and transmitting program code 132.

The different components illustrated for data processing system 100 are not meant to provide architectural limitations to the manner in which different embodiments may be implemented. The different illustrative embodiments may be implemented in a data processing system including components in addition to, or in place of, those illustrated for data processing system 100. Other components shown in FIG. 1 can be varied from the illustrative examples shown. The different embodiments may be implemented using any hardware device or system capable of executing program code. As one example, the data processing system may include organic components integrated with organic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 134 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Illustrative embodiments provide a computer implemented method, system, and computer program product for effective project size estimation. In response to receiving an input to predict a size of effort required to complete a project, a project size prediction application identifies a set of metrics associated with the project. Then, the project size prediction application constructs all possible subsets of metrics from the identified set of metrics associated with the project. The project size prediction application generates one project size prediction model for each constructed subset of metrics from the identified set of metrics associated with the project.

Then, the project size prediction application calculates an accuracy score for each generated project size prediction model. Afterward, the project size prediction application selects a project size prediction model with a highest calculated accuracy score to identify a subset of effective metrics for the project. The subset of effective metrics is associated with the project size prediction model with the highest calculated accuracy score. Subsequently, the project size prediction application outputs the project size prediction model with the highest calculated accuracy score for use by a project developer.

Thus, illustrative embodiments build a prediction model for a particular project from identified metrics. Illustrative embodiments do not aggregate the identified metrics to avoid bias. Illustrative embodiments directly use all identified metrics in the effort prediction model. In the ideal case, illustrative embodiments use all possible subsets of the identified metrics to build prediction models. The subset of identified metrics that produces the most accurate effort prediction model is selected as the subset of effective metrics.

Estimation of project size is a prerequisite to successful management of any project development. With accurate project size estimation, effort required for project development may be easily predicted and resources may be efficiently allocated resulting in very near realistic time schedules. The ultimate goal of project size estimation is to assist project managers predict the effort required for development in the project planning phase.

Figure 2:
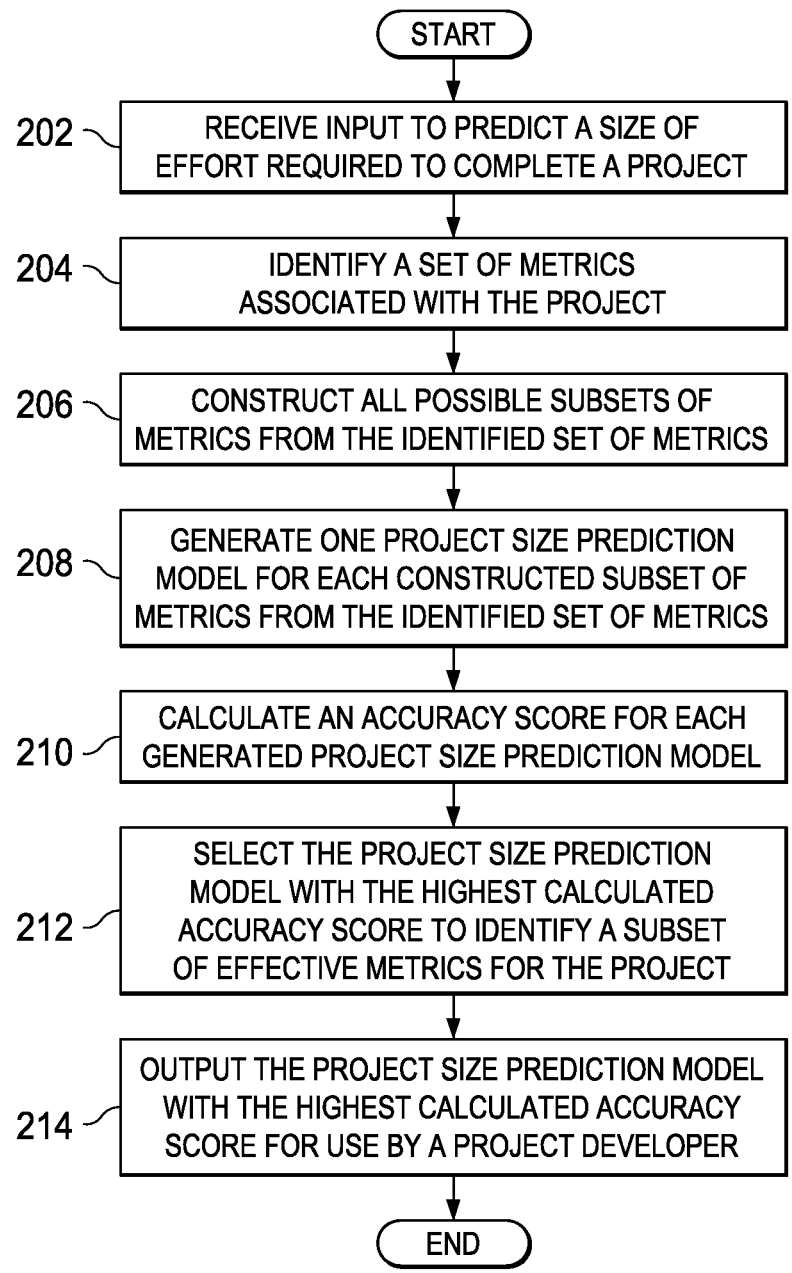
FIG. 2 is a flowchart illustrating an exemplary process for selecting a subset of effective metrics from all identified metrics in accordance with an illustrative embodiment.

With reference now to FIG. 2, a flowchart illustrating an exemplary process for selecting a subset of effective metrics from all identified metrics is shown in accordance with an illustrative embodiment. The process shown in FIG. 2 may be implemented in a project size prediction application, such as project size prediction application 116 in FIG. 1.

The process begins when the project size prediction application receives an input to predict a size of effort required to complete a project (step 202). The project may be any type of project, such as, for example, a house building project or a software application development project. Then, the project size prediction application identifies a set of metrics, such as set of metrics 120 in FIG. 1, associated with the project (step 204). The set of metrics includes all identified metrics associated with the project. The set of metrics may, for example, be $m_1, m_2, m_3, \ldots m_n$.

After identifying the set of metrics associated with the project in step 204, the project size prediction application constructs all possible subsets of metrics from the identified set of metrics (step 206). The subsets of metrics may, for example, be $s_1, s_2, s_3, \ldots s_k$, where k is equal to $2^n-1$. Assume that the project size prediction application identifies three metrics associated with the project. As a result, the project size prediction application constructs subsets of metrics $[m_1]$, $[m_2]$, $[m_3]$, $[m_1, m_2]$, $[m_1, m_3]$, $[m_2, m_3]$, and $[m_1, m_2, m_3]$ from the three identified metrics associated with the project.

Subsequent to constructing all possible subsets of metrics in step 206, the project size prediction application generates one project size prediction model for each constructed subset of metrics from the identified set of metrics, such as project size prediction models 122 in FIG. 1 (step 208). Assume the project size prediction application generates the prediction models for each constructed subset of metrics in order. As a result, the project size prediction models are $M_1, M_2, M_3, \ldots M_k$.

Then, the project size prediction application calculates an accuracy score for each generated project size prediction model (step 210). The project size prediction application may, for example, use Mean Magnitude of Relative Error (MMRE) to calculate the accuracy score. MMRE is the de facto standard evaluation criterion for accessing the accuracy of software prediction models. MMRE is the mean value of Magnitude of Relative Error (MRE). The project size prediction application calculates the MRE for each project as: MRE is equal to $Effort_{actual}$ minus $Effort_{predicted}$ divided by $Effort_{actual}$. The project size prediction application may, for example, measure the "Effort" required for project development in terms of a man-day (MD). The accuracy of each project size prediction model is the accuracy when the project size prediction application applies the project size prediction model to a new project.

After calculating an accuracy score for each generated project size prediction model in step 210, the project size prediction application selects the project size prediction model with the highest calculated accuracy score to identify a subset of effective metrics, such as subset of effective metrics 122 in FIG. 1, for the project (step 212). Assume the project size prediction model with the highest calculated accuracy score is $M_i$. As a result, the subset of metrics that corresponds to project size prediction model $M_i$ is the subset of effective metrics for the project, which in this example would be $s_i$. The project size prediction application uses subset of effective metrics $s_i$ to predict the amount of effort required for projects that are used as validation or testing data, such as testing data set 130 in FIG. 1.

Subsequently, the project size prediction application outputs the project size prediction model with the highest calculated accuracy score for use by a project developer (step 214). The project size prediction application may, for example, output the project size prediction model with the highest calculated accuracy score on a display device, such as display 114 in FIG. 1, or to a printer, such as input/output unit 112 in FIG. 1. Thereafter, the process terminates.

However, it is time consuming to build one project size prediction model on each subset of metrics, especially when the total number of identified metrics for the project is large. Based on project experience knowledge, some identified metrics associated with the project are essential for effort prediction, while other identified metrics may be negligible for effort prediction. Project experience knowledge is knowledge that a developer or application gains by completing same or similar projects over a period of time. This project experience knowledge may be stored in one or more databases, for example, as project historical data.

Consequently, the project size prediction application may select a minimum subset of essential metrics from the original set of all identified metrics associated with the project based on experience knowledge. Alternatively, a project developer may select the minimum subset of essential metrics in addition to, or instead of, the project size prediction application making the selection. Then, the original metric selection process is only performed for metrics not in this minimum subset of essential metrics. As a result, this approach improves the efficiency of illustrative embodiments by reducing the number of metrics to select from and, thus, the number of prediction models to generate.

Figure 3:
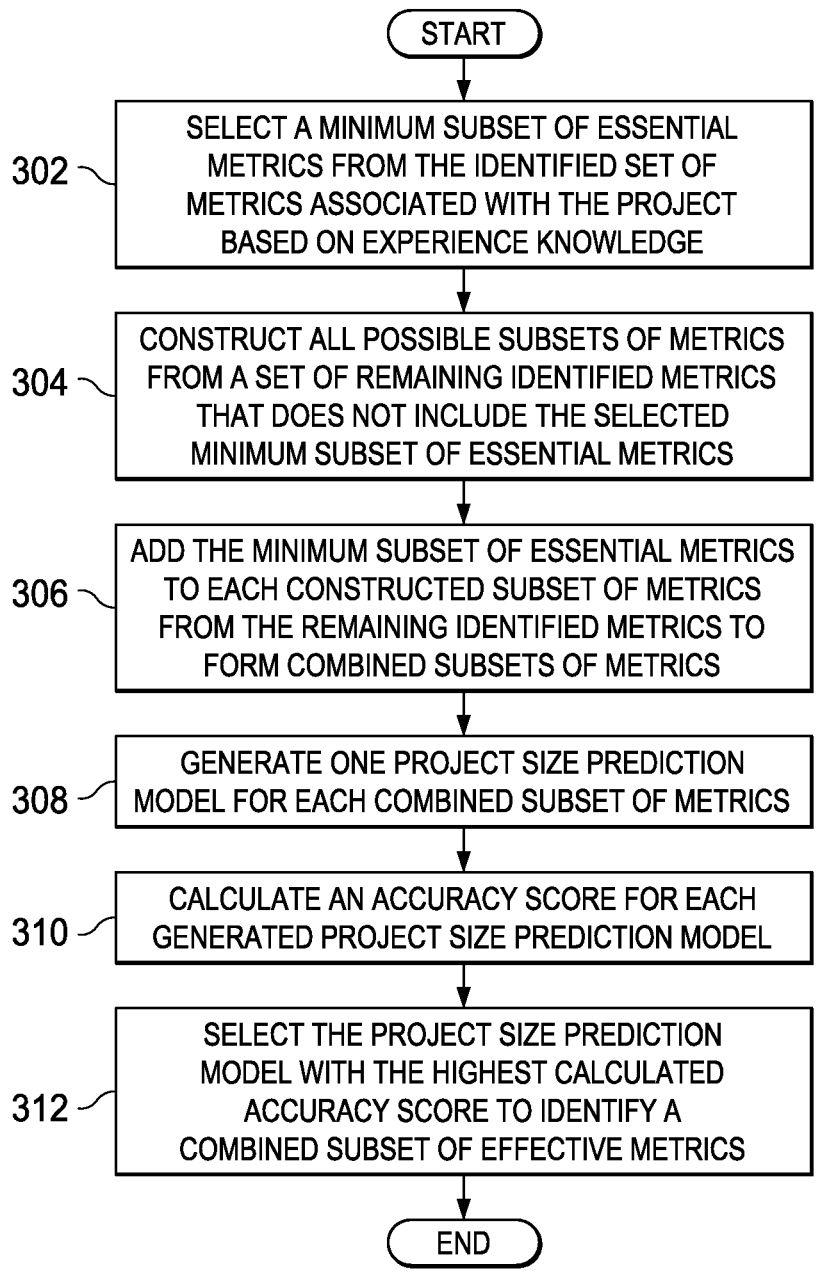
FIG. 3 is a flowchart illustrating an exemplary process for selecting a minimum subset of essential metrics based on experience knowledge in accordance with an illustrative embodiment.

With reference now to FIG. 3, a flowchart illustrating an exemplary process for selecting a minimum subset of essential metrics based on experience knowledge is shown in accordance with an illustrative embodiment. The process shown in FIG. 3 may be implemented in a project size prediction application, such as project size prediction application 116 in FIG. 1.

The process begins when the project size prediction application selects a minimum subset of essential metrics, such as minimum subset of essential metrics 124 in FIG. 1, from an identified set of metrics associated with the project based on experience knowledge (step 302). The project size prediction application identified the set of metrics associated with the project in step 204 in FIG. 2. Assume that j metrics exist in minimum subset of essential metrics $s_{min}$.

After selecting the minimum subset of essential metrics in step 302, the project size prediction application constructs all possible subsets of metrics from the set of remaining identified metrics that does not include the selected minimum subset of essential metrics for the project (step 304). For example, the project size prediction application constructs subsets of n minus j (n−j) metrics to form the minimum subset of essential metrics. Assume that the subsets of metrics from the set of remaining identified metrics are $s_1, s_2, s_3, \ldots s_{k'}$, where k' is equal to $2^{(n-j)}-1$.

Then, the project size prediction application adds the minimum subset of essential metrics "j" to each constructed subset of metrics from the remaining identified metrics to form combined subsets of metrics (step 306). Assume that the project size prediction application identified three metrics $[m_1]$, $[m_2]$, and $[m_3]$ for the project and that the minimum subset of essential metrics is $[m_1]$. As a result, the project size prediction application constructs the subsets of metrics $[m_2]$,

[m₃], and [m₂, m₃] from the remaining identified metrics. Subsequently, the project size prediction application adds the minimum subset of essential metrics [m₁] to each constructed subset of metrics [m₂], [m₃], and [m₂, m₃]. Thus, the resulting combined subsets of metrics are [m₁, m₂], [m₁, m₃], and [m₁, m₂, m₃].

Then, the project size prediction application generates one project size prediction model for each combined subset of metrics (step 308). Assume that the generated project size prediction models for each of the combined subsets of metrics are $M_1, M_2, M_3, \ldots M_k$. After generating one project size prediction model for each combined subset of metrics in step 308, the project size prediction application calculates an accuracy score for each generated project size prediction model (step 310).

Then, the project size prediction application selects the project size prediction model with the highest calculated accuracy score to identify a combined subset of effective metrics (step 312). Assume the project size prediction model with the highest calculated accuracy score is $M_i$. As a result, the subset of metrics $s_i$, which corresponds to project size prediction model $M_i$, and minimum subset of essential metrics [m₁] are the combined subset of effective metrics for the project in this example. The project size prediction application uses the combined subset of effective metrics to predict the amount of effort required for projects that are used for validation or testing data. Thereafter, the process terminates.

Figure 4:
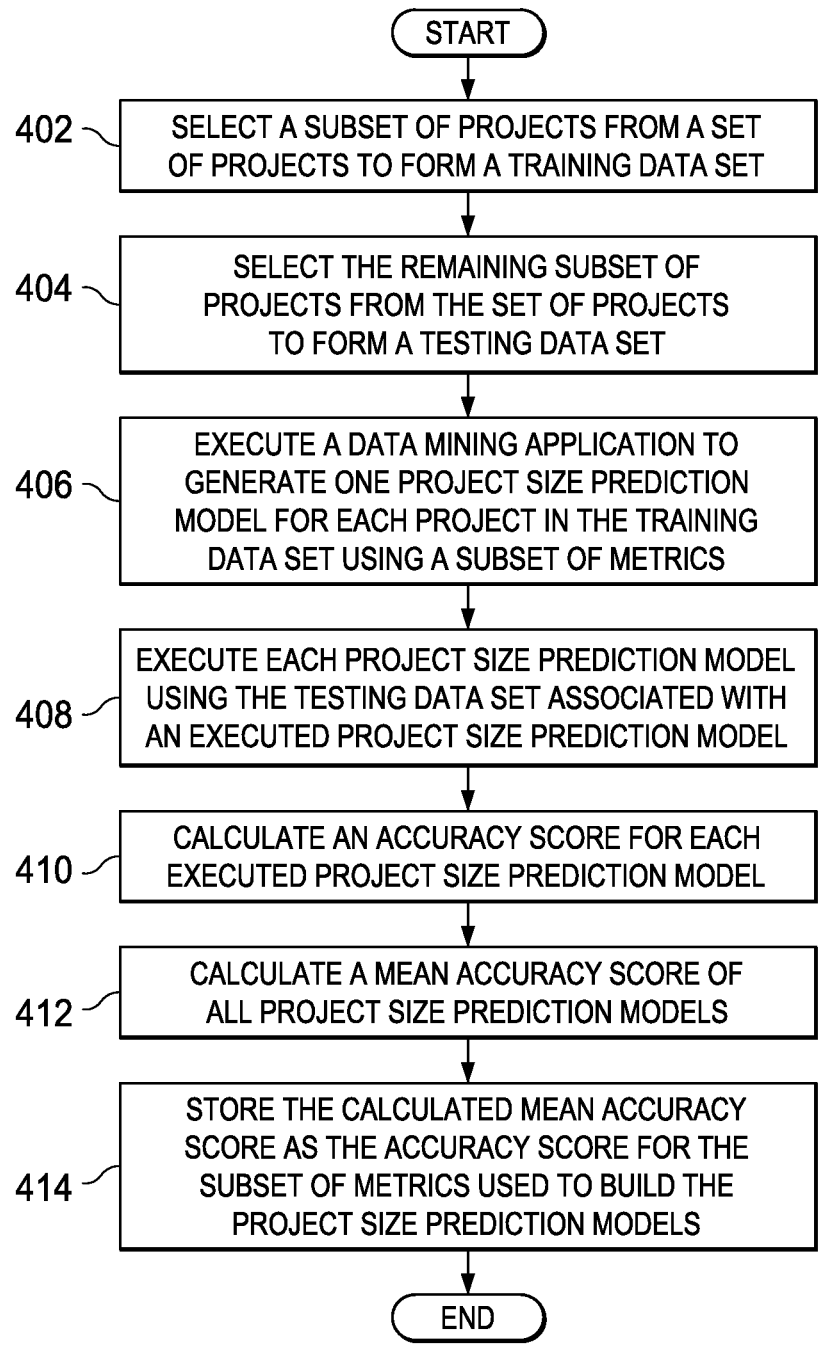
FIG. 4 is a flowchart illustrating an exemplary process for calculating the accuracy of a prediction model built on one subset of metrics in accordance with an illustrative embodiment.

With reference now to FIG. 4, a flowchart illustrating an exemplary process for calculating the accuracy of a prediction model built on one subset of metrics is shown in accordance with an illustrative embodiment. The process shown in FIG. 4 may be implemented in a project size prediction application, such as project size prediction application 116 in FIG. 1. Also, the process shown in FIG. 4 may be implemented in step 210 in FIG. 2 and step 310 in FIG. 3.

The process begins when the project size prediction application selects a subset of projects from a set of projects to form a training data set, such as training data set 128 in FIG. 1 (step 402). Assume that "n" number of total projects exist and that the project size prediction application selects "x" number of projects as training data. The minimum value for "x" is one half "n".

Then, the project size prediction application selects the remaining subset of projects from the set of projects, (n−x), as a validation or testing data set, such as testing data set 130 in FIG. 1 (step 404). Assume that the training data sets are $s_1, s_2, \ldots s_k$ and that the corresponding testing data sets are $s'_1, s'_2, \ldots s'_k$. Then, the project size prediction application executes a data mining application, such as data mining application 118 in FIG. 1, to generate one project size prediction model for each project in the training data set "x" using a subset of metrics "S" (step 406). Assume the project size prediction application builds the project size prediction models $M_1, M_2, \ldots M_k$ in order.

Then, the project size prediction application executes each project size prediction model built using the testing data set associated with the executed project size prediction model (step 408). For example, the project size prediction application executes project size prediction model $M_1$ using associated testing data set $s'_1$. Then, the project size prediction application calculates a mean accuracy score (MMRE) for each executed project size prediction model built on the subset of metrics "S" (step 410). Then, the project size prediction application calculates a mean accuracy score of all project size prediction models (mean MMRE) built on the subset of metrics "S" (step 412). Subsequently, the project size prediction application stores the calculated mean accuracy score as the accuracy score for the subset of metrics "S" used to build the project size prediction models (step 414). The process terminates thereafter.

With reference now to FIG. 5, an exemplary illustration of a process for effective project size estimation is shown in accordance with an illustrative embodiment. Effective project size estimation process 500 includes variables 502. Variables 502 include variables "n", "x", "r", and "errHT". Variable "n" is equal to the total number of projects in a historical data set. Variable "x" is equal to the number of projects in a training data set. Variable "r" is the number of tests executed for each subset of metrics. Variable "errHT" is a hash table that stores the mappings between subsets of metrics and their respective calculated mean accuracy score.

Effective project size estimation process 500 tries all possible subsets of metrics constructed from the set of identified metrics associated with a project in order to select the most effective subset of metrics, which is used as prediction model input at 504. For each subset of metrics constructed, effective project size estimation process 500 runs "r" number of tests on each subset of metrics constructed in order to calculate an average performance (MMRE) for each of the subsets of metrics constructed at 506. Then, effective project size estimation process 500 selects "x" number of projects from a total number of projects "n" as a training data set and a corresponding "n" minus "x" number of remaining projects as a validation or testing data set at 508. Afterward, effective project size estimation process 500 builds a prediction model "m" from the training data set at 510. Subsequently, effective project size estimation process 500 executes the prediction model built using the validation or testing data set at 512. For each project used in the validation or testing data set, effective project size estimation process 500 adds the "$\text{Effort}_{predicted}$" man-day values and the "$\text{Effort}_{actual}$" man-day values required for project development at 514.

Afterward, effective project size estimation process 500 calculates an accuracy score or MRE for the prediction model built at 516. Then, effective project size estimation process 500 calculates a mean accuracy score or MMRE for the prediction model built at 518. Subsequently, effective project size estimation process 500 selects the subset of metrics in the "errHT" hash table with the minimum average error or highest accuracy score at 520. Afterward, effective project size estimation process 500 stores the subset of metrics as "S" at 522. Then, effective project size estimation process 500 uses "S" (i.e., the subset of metrics with the highest accuracy score) to build a prediction model "M" based on the total number of projects "n" at 524.

Subsequently, effective project size estimation process 500 enters a set of metric values for a new project at 526. Afterward, effective project size estimation process 500 runs prediction model "M" using the entered set of metric values for the new project at 528. Then, effective project size estimation process 500 estimates the effort required for the new project at 530.

Thus, illustrative embodiments of the present invention provide a computer implemented method, system, and computer program product for automatically estimating project size and effort required for project development. The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for effective project size estimation, the computer implemented method comprising:

responsive to receiving an input to predict a size of effort required to complete a project, identifying, by a computer, a set of all metrics associated with the project;

selecting, by the computer, a minimum subset of essential metrics from the set of all metrics associated with the project based on experience knowledge to form a selected minimum subset of essential metrics;

selecting, by the computer, a plurality of remaining metrics from the set of all metrics associated with the project that does not include the selected minimum subset of essential metrics which reduces a number of metrics to select from;

constructing, by the computer, all possible combinations of subsets of metrics from each metric and each combination of different metrics within the plurality of remaining that does not include the selected minimum subset of essential metrics;

combining, by the computer, the minimum subset of essential metrics with each subset of the all possible combinations of subsets of metrics constructed from each metric and each combination of different metrics within the plurality of remaining to form combined subsets of metrics;

generating, by the computer, one project size prediction model for each combined subset of metrics;

calculating, by the computer, an accuracy score for each generated project size prediction model;

selecting, by the computer, a project size prediction model with a highest calculated accuracy score to identify a subset of effective metrics for the project, wherein the subset of effective metrics is associated with the project size prediction model with the highest calculated accuracy score; and outputting, by the computer, the project size prediction model with the highest calculated accuracy score.

2. The computer implemented method of claim 1, further comprising:

selecting, by the computer, a subset of projects from a total number of projects in a historical dataset to be used as a training data set, wherein a minimum number of the subset of projects used as training data is one half of the total number of projects in the historical dataset;

selecting, by the computer, a remaining subset of projects from the total number of projects that was not used in the training data set to be used as a testing data set;

executing, by the computer, a data mining application that is a machine learning neural network that approximates non-linear functions to generate one project size prediction model for each project in the training data set using a subset of metrics;

executing, by the computer, each generated project size prediction model using the testing data set associated with executed project size prediction models;

calculating, by the computer, an accuracy score for each of the executed project size prediction models;

calculating, by the computer, a mean accuracy score of all of the executed project size prediction models to form a calculated mean accuracy score; and storing, by the computer, the calculated mean accuracy score as an accuracy score for the subset of metrics used to build each of the project size prediction models.

3. The computer implemented method of claim 1, wherein the set of all metrics is a plurality of metrics associated with the project, and wherein a metric in the plurality of metrics quantifies a portion of the project and influences development of the project.

4. The computer implemented method of claim 1, wherein the project is a planned program of work that requires an amount of time, effort, and planning to complete.

5. The computer implemented method of claim 1, wherein a project size prediction model is a generated model used to predict the size of effort required to complete the project based on the set of all metrics associated with the project.

6. The computer implemented method of claim 1, wherein the subset of effective metrics is a subset of one or more metrics from the set of all metrics associated with the project that most influences development of the project.

7. The computer implemented method of claim 1, wherein the experience knowledge is provided by a project size prediction application based on at least one of same or similar projects.

8. The computer implemented method of claim 1, wherein mean magnitude of relative error is used to calculate the accuracy score.

9. A data processing system for effective project size estimation, comprising:

a bus system;

a storage device connected to the bus system, wherein the storage device stores a set of instructions; and a processing unit connected to the bus system, wherein the processing unit executes the set of instructions to identify a set of all metrics associated with a project in response to receiving an input to predict a size of effort required to complete the project; select a minimum subset of essential metrics from the set of all metrics associated with the project based on experience knowledge to form a selected minimum subset of essential metrics; select a plurality of remaining metrics from the set of all metrics associated with the project that does not include the selected minimum subset of essential metrics which reduces a number of metrics to select from; construct all possible combinations of subsets of metrics from each metric and each combination of different metrics within the plurality of remaining that does not include the selected minimum subset of essential metrics; combine the minimum subset of essential metrics with each subset of the all possible combinations of subsets of metrics constructed from each metric and each combination of different metrics within the plurality of remaining to form combined subsets of metrics; generate one project size prediction model for each combined subset of metrics; calculate an accuracy score for each generated project size prediction model; select a project size prediction model with a highest calculated accuracy score to identify a subset of effective metrics for the project, wherein the subset of effective metrics is associated with the project size prediction model with the highest calculated accuracy score; and output the project size prediction model with the highest calculated accuracy score.

10. The data processing system of claim 9, wherein the processing unit executes a further set of instructions to select a subset of projects from a total number of projects in a historical dataset to be used as a training data set, wherein a minimum number of the subset of projects used as training data is one half of the total number of projects in the historical dataset; select a remaining subset of projects from the total number of projects that were not used in the training data set to be used as a testing data set; execute a data mining application that is a machine learning neural network that approximates non-linear functions to generate one project size prediction model for each project in the training data set using a subset of metrics; execute each generated project size prediction model using the testing data set associated with executed project size prediction models; calculate an accuracy score for each of the executed project size prediction models; calculate a mean accuracy score of all of the executed project size prediction models to form a calculated mean accuracy score; and store the calculated mean accuracy score as an accuracy score for the subset of metrics used to build each of the project size prediction models.

11. A computer program product stored in a non-transitory computer readable storage device having computer usable program code embodied therein that is executable by a computer for effective project size estimation, the computer program product comprising:

computer usable program code for identifying a set of all metrics associated with a project in response to receiving an input to predict a size of effort required to complete the project;

computer usable program code for selecting a minimum subset of essential metrics from the set of all metrics associated with the project based on experience knowledge to form a selected minimum subset of essential metrics;

computer usable program code for selecting a plurality of remaining metrics from the set of all metrics associated with the project that does not include the selected minimum subset of essential metrics which reduces a number of metrics to select from;

computer usable program code for constructing all possible combinations of subsets of metrics from each metric and each combination of different metrics within the plurality of remaining that does not include the selected minimum subset of essential metrics;

computer usable program code for combining the minimum subset of essential metrics with each subset of the all possible combinations of subsets of metrics constructed from each metric and each combination of different metrics within the plurality of remaining to form combined subsets of metrics;

computer usable program code for generating one project size prediction model for each combined subset of metrics;

computer usable program code for calculating an accuracy score for each generated project size prediction model;

computer usable program code for selecting a project size prediction model with a highest calculated accuracy score to identify a subset of effective metrics for the project, wherein the subset of effective metrics is associated with the project size prediction model with the highest calculated accuracy score; and computer usable program code for outputting the project size prediction model with the highest calculated accuracy score.

12. The computer program product of claim 11, further comprising:

computer usable program code for selecting a subset of projects from a total number of projects in a historical dataset to be used as a training data set, wherein a minimum number of the subset of projects used as training data is one half of the total number of projects in the historical dataset;

computer usable program code for selecting a remaining subset of projects from the total number of projects that were not used in the training data set to be used as a testing data set;

computer usable program code for executing a data mining application that is a machine learning neural network that approximates non-linear functions to generate one project size prediction model for each project in the training data set using a subset of metrics;

computer usable program code for executing each generated project size prediction model using the testing data set associated with executed project size prediction models;

computer usable program code for calculating an accuracy score for each of the executed project size prediction models;

computer usable program code for calculating a mean accuracy score of all of the executed project size prediction models to form a calculated mean accuracy score; and computer usable program code for storing the calculated mean accuracy score as an accuracy score for the subset of metrics used to build each of the project size prediction models.

13. The computer program product of claim 11, wherein the set of all metrics is a plurality of metrics associated with the project, and wherein a metric in the plurality of metrics quantifies a portion of the project and influences development of the project.

14. The computer program product of claim 11, wherein the project is a planned program of work that requires an amount of time, effort, and planning to complete.

15. The computer program product of claim 11, wherein a project size prediction model is a generated model used to predict the size of effort required to complete the project based on the set of all metrics associated with the project.

16. The computer program product of claim 11, wherein the subset of effective metrics is a subset of one or more metrics from the set of all metrics associated with the project that most influences development of the project.

17. The computer program product of claim 11, wherein the experience knowledge is provided by a project size prediction application based on at least one of same or similar projects.

* * * * *